June 12, 1962  W. D. SCOATES  3,038,335
PITOT TUBES
Filed Oct. 7, 1959  4 Sheets-Sheet 1
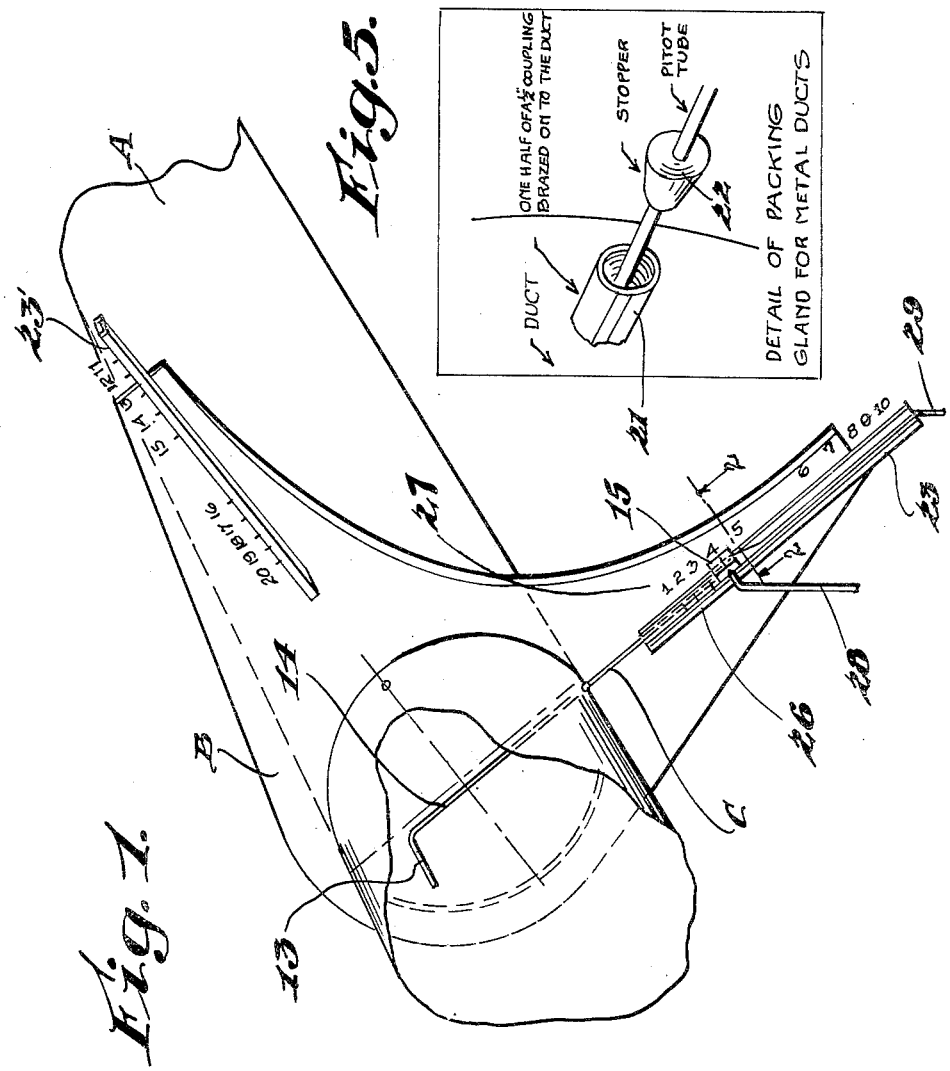
INVENTOR
William D. Scoates
BY
ATTORNEY June 12, 1962  W. D. SCOATES  3,038,335
PITOT TUBES
Filed Oct. 7, 1959  4 Sheets-Sheet 2
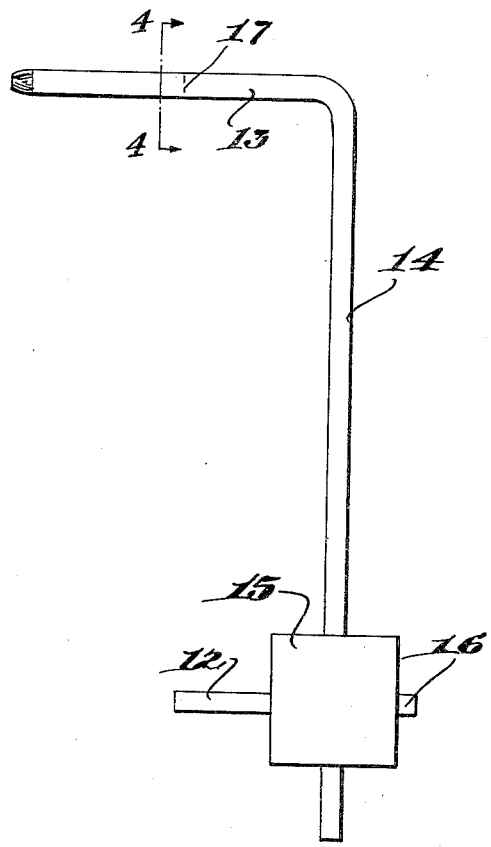
Fig. 3.
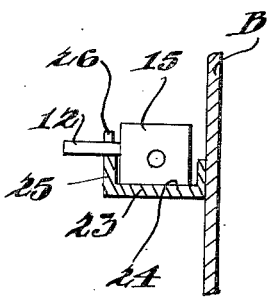
Fig. 4.
Fig. 2.
INVENTOR
William D. Scoates
BY Robert van Sickler
ATTORNEY June 12, 1962 W. D. SCOATES 3,038,335
PITOT TUBES Filed Oct. 7, 1959 4 Sheets-Sheet 3

INVENTOR
William D. Scoates
BY R. Herman Lickler
ATTORNEY

June 12, 1962  W. D. SCOATES  3,038,335
PITOT TUBES

Filed Oct. 7, 1959  4 Sheets-Sheet 4

INVENTOR
William D. Scoates
BY
ATTORNEY

United States Patent Office 3,038,335
Patented June 12, 1962

3,038,335
PITOT TUBES
William D. Scoates, College Station, Tex.
Filed Oct. 7, 1959, Ser. No. 844,975
1 Claim. (Cl. 73—212)

This invention relates to the positioning of a Pitot tube for measuring the flow of fluid within a duct.

The object of this invention is the provision of a Pitot tube and support for the tube so arranged that the tube may be positioned with its tip at any of several selected points within the duct and oriented to be subject to the pressure of the flow of fluid so that the pressure in the line of flow may be determined at any of a plurality of selected points in a surface transverse to the flow.

FIG. 1 is a perspective view of the assembly of Pitot tube and duct in accordance with my invention.

FIG. 2 is a detail cross-section on line 2—2 of FIG. 1.

FIGURE 3 is a side elevation of the Pitot tube of my invention.

FIG. 4 is a detail cross-section on line 4—4 of FIG. 3.

FIG. 5 is a perspective view of a detail of construction.

Figure 6:
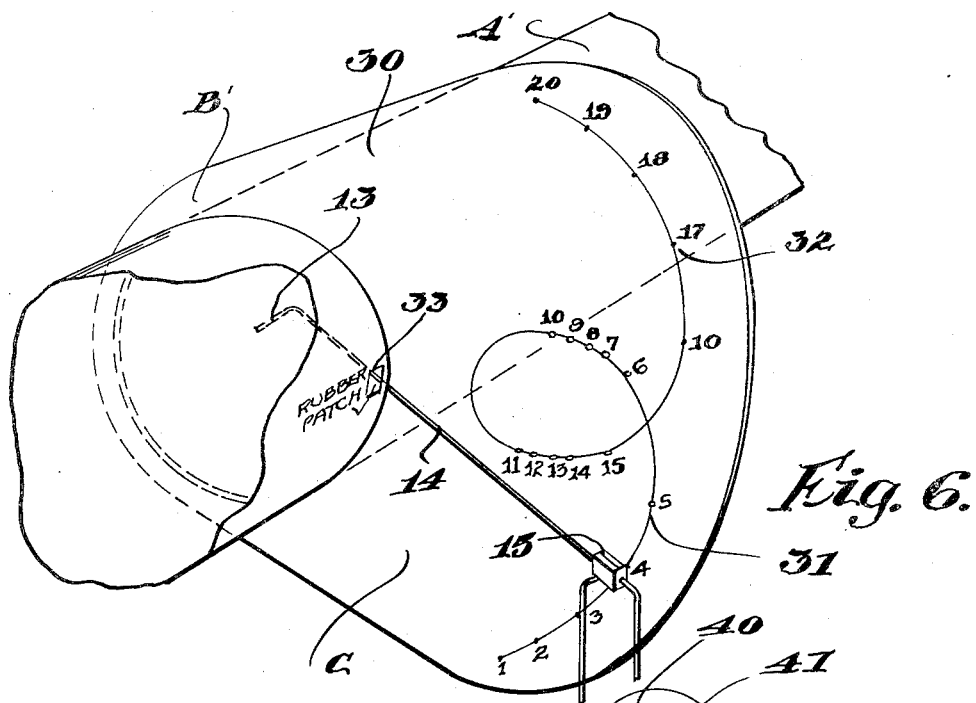
FIG. 6 is a perspective view of a second embodiment.

The invention resides in the assembly of duct A provided with a support B and a Pitot tube C having its tip positioned at selected points within the duct, and in the cooperating formations on said Pitot tube and support provided for this purpose.

The Pitot tube C is of the type usually used to measure the velocity of the flow of fluid by the difference in the pressure at its tip in the lin of flow and the lateral or "static" pressure transversely of the flow. It consists of an inner tube 10 open at each end, an outer surrounding tube 11 closed at both ends and a lateral static pressure tube 12, which is connected to the outer tube to communicate with the space between the inner and outer tubes. The concentric tubes 10 and 11 are formed with a right angle bend to provide an end portion 13 and stem 14, and the outer tube 11 has a series of openings 17 in its wall in the end portion 13.

In order to maintain the inner end of the Pitot tube C with the opening of tube 10 at that end in proper position in the duct A, a supporting and positioning element 15 is fixed to the outer end of the tube at the junction of the stem 14 and static pressure tube 12. The element 15 is shown as a rectangular member enclosing the junction of the two tubes and may be provided with a pin 16 threaded into one side for locating and maintaining the tube in proper position when in engagement with a support having cooperating formations.

The support B carried by the duct is formed with guiding and positioning means to cooperate with elements of the Pitot tube. The guiding member 23 has a surface 24 slidably supporting the element 15 and ribs 25 for guiding that element. Pins 26 on the member 23 are selectively engageable by the static pressure tube 12 to maintain the end portion 13 of the tube in the proper location within the duct. Indicia 27 on the support designate the several pins and thereby the location of the end portion 13.

The stem 14 of the Pitot tube extends through the wall of the duct with its end portion 13 exending longitudinally of the duct. A packing gland in the wall of the duct consists of a short sleeve or coupling 21 fixed to the duct and a resilient apertured member 22 slidably receiving the stem 14 secured in the coupling. The block 15 is slidably supported on the guide surface 24 between ribs 25 of member 23, and the tube 12 abuts one of the pins 26 to locate the tip of the tube in the duct. Flexible tubes 28, 29 serve to connect the static pressure tube 12 and the total pressure tube 10 to a measuring instrument.

As may be seen in FIG. 1, the guide member 23 positions the tube at selected points along a diameter of the duct A. In order to provide for locating the tube along other diameters, duplicate guide members 23′ may be provided aligned along other diameters. Thus the tube C may be positioned with the open inner end of tube 10 in the duct at any selected point along a plurality of diameters, so that the pressure in the line of flow may be determined at a plurality of points in a surface transverse to the flow of fluid.

In the form shown in FIG. 6, the support B′ has a plane surface 30 transverse to the duct provided with openings 31 within which pin 16 may be received, these complementary formations locating the tip of end portion 13 within the duct. As shown in this embodiment, the openings 31 and 32 lie along a curve in such manner that the tip will be positioned at several points along two different diameters. The stem 14 passes through a patch 33 of resilient material fixed in the wall of the duct to permit the necessary angular movement of the tube. The surface 30 forms a guiding surface for the stem 14 so that the tip of the end portion 13 will lie in a surface with the duct transverse to the flow of fluid. Any points in a transverse surface for positioning the tip of the Pitot tube may be selected by providing the positioning openings in the support B′.

Figure 7:
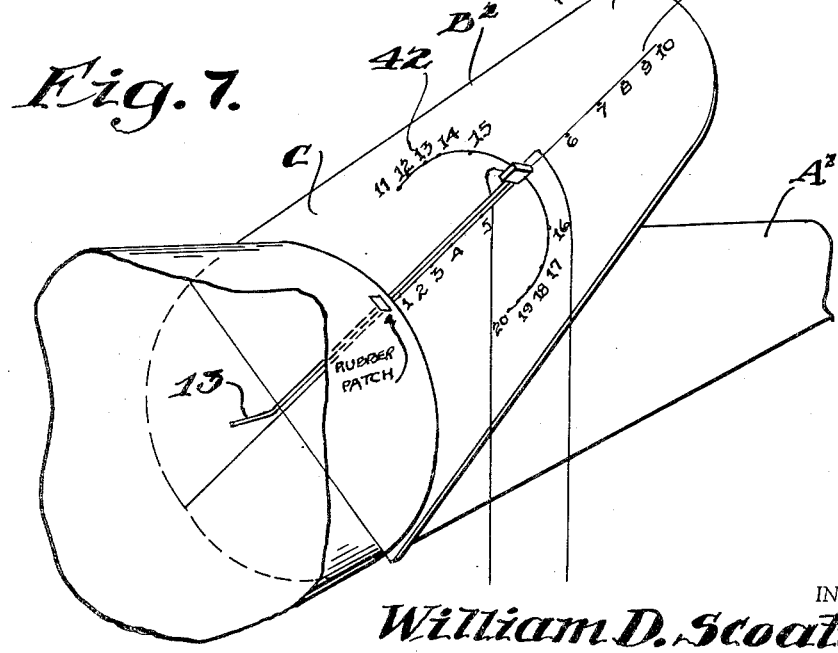
FIG. 7 is a perspective view of a third embodiment.

FIG. 7 shows a further modification in which the support $B^2$ on duct $A^2$ has a plane guiding surface 40 which cooperates with block 15 as in FIG. 6. In this embodiment, the openings 41 in the support lie along a straight line and position the tip of tube C along one diameter, while the openings 42 lie on a curve to position the tip along a different diameter.

Figure 8:
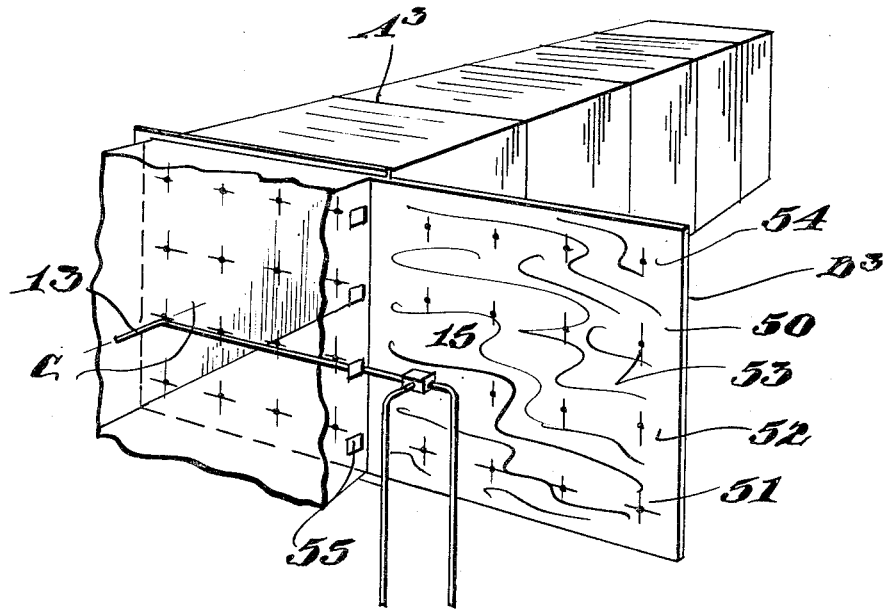
FIG. 8 is a perspective view of a fourth embodiment.

FIG. 8 shows the arrangement of support for a rectangular duct $A^3$. The support $B^3$ has a plane surface 50 transverse to the axis of the duct, and a plurality of series of openings 51, 52, 53, 54, each series lying along a line transverse of the duct. In this embodiment, the tube C is inserted in the duct through one of the resilient patches 55, and then the pin 16 is inserted in one of the openings.

In operation, the tip of the tube is positioned with the end portion 13 parallel to the axis of the duct, due to the complementary surfaces on the element 15 and support, so that the pressure longitudinally of the fluid is transmitted through tube 10. The openings 17 subject the outer tube 11 to fluid pressure transverse to the line of flow for comparison with the pressure in tube 10 to produce a measure of the velocity of the flow. The Pitot tube according to this invention may be positioned by cooperation of complementary formations on the Pitot tube and support to locate the tip at several points within the duct to determine the values of the fluid pressure at those points.

The structure herein shown is for the purpose of illustrating how this invention is to be applied. It is obvious that other embodiments may be designed, without departing from the essential characteristics of the invention, which are defined in the claim below.

I claim:

In combination, a duct for confining a flow of fluid, a Pitot tube comprising a rigid stem having an end portion within the duct positioned with its tip at any of a plurality of selected points within the duct and with its opposite end extending through the wall of said duct, said Pitot tube comprising an internal tube with an opening at said tip at one end subjected to pressure of the fluid in one direction within said duct, a surrounding external tube subjected to pressure of said fluid in a direction transverse to that of the tip, and a lateral pressure tube connected to said external tube adjacent said opposite end, supporting means external of and rigid with said duct and provided with a plurality of similar formations engageable by said Pitot tube, said Pitot tube being provided with formations at the junction of said external tube and said lateral pressure tube complementary to and interengageable with the formations on said supporting means, said complementary formations cooperating to maintain the tip of said Pitot tube oriented with respect to said fluid flow to be subjected to the pressure in the line of flow, and to maintain the tip of the Pitot tube in any of a plurality of selected positions on any one of a plurality of diameters so that the pressure of said fluid in the line of flow may be determined at a plurality of spaced points within said duct.

References Cited in the file of this patent

UNITED STATES PATENTS

| | | |
|---|---|---|
| 1,288,363 | Young | Dec. 17, 1918 |
| 2,182,280 | Chipley et al. | Dec. 5, 1939 |
| 2,650,497 | Renwanz | Sept. 1, 1953 |
| 2,706,409 | Preston | Apr. 19, 1955 |
| 2,714,819 | Clark | Aug. 9, 1955 |
| 2,791,905 | Cheney | May 14, 1957 |